(12) United States Patent
Jung et al.

(10) Patent No.: US 11,362,699 B2
(45) Date of Patent: *Jun. 14, 2022

(54) MOBILE TERMINAL

(71) Applicant: LG ELECTRONICS INC., Seoul (KR)

(72) Inventors: Kangjae Jung, Seoul (KR); Dongjin Kim, Seoul (KR); Yunmo Kang, Seoul (KR); Sungjoon Hong, Seoul (KR); Kyoungsun Hwang, Seoul (KR); Sungjung Rho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/172,324

(22) Filed: Feb. 10, 2021

(65) Prior Publication Data

US 2021/0175922 A1 Jun. 10, 2021

Related U.S. Application Data

(63) Continuation of application No. 16/480,978, filed as application No. PCT/KR2017/000952 on Jan. 26, 2017, now Pat. No. 10,951,260.

(51) Int. Cl.
*H04B 1/525* (2015.01)
*H01Q 1/24* (2006.01)
*H04M 1/02* (2006.01)

(52) U.S. Cl.
CPC ............ *H04B 1/525* (2013.01); *H01Q 1/243* (2013.01); *H04M 1/0202* (2013.01)

(58) Field of Classification Search
None
See application file for complete search history.

(56) References Cited

U.S. PATENT DOCUMENTS 9,413,058 B1 8/2016 Kuo et al.
9,509,042 B1 11/2016 Zheng et al.
(Continued)

FOREIGN PATENT DOCUMENTS

CN 203536554 U 4/2014
CN 204538197 U 8/2015
(Continued)

OTHER PUBLICATIONS

Dŏng, "A Study of Miniaturized Broadband and Multi-hand Antennas for Mobile Handsets," Mar. 2014, pp. 1-55, with English translation.

*Primary Examiner* — Anh Q Tran
(74) *Attorney, Agent, or Firm* — Birch, Stewart, Kolasch & Birch, LLP

(57) ABSTRACT

A mobile terminal including a body for receiving an electronic component therein; a middle frame mounted on the body a main board mounted on the body; a side case surrounding an edge of the body, wherein the side case includes a plurality of antenna radiators having a first end and a second end, and a plurality of slits defined between the plurality of antenna radiators; a ground line connected to each of the antenna radiators; and a feeding line for supplying power to each of the antenna radiators. Further, each of the antenna radiators includes the second end grounded by the ground line and the first end spaced apart from the second end of a neighbor antenna radiator.

12 Claims, 12 Drawing Sheets

(56) References Cited

U.S. PATENT DOCUMENTS

| | | | |
|---|---|---|---|
| 10,951,260 B2 * | 3/2021 | Jung | ............... H04B 1/525 |
| 2013/0076580 A1 | 3/2013 | Zhang et al. | |
| 2013/0135157 A1 | 5/2013 | Tsou et al. | |
| 2014/0078008 A1 | 3/2014 | Kang et al. | |
| 2014/0139379 A1 | 5/2014 | Bolin et al. | |
| 2015/0171916 A1 | 6/2015 | Asrani et al. | |
| 2016/0013543 A1 | 1/2016 | Nguyen | |
| 2016/0285151 A1 | 9/2016 | Lee et al. | |

FOREIGN PATENT DOCUMENTS

| | | | |
|---|---|---|---|
| CN | 104937772 A | 9/2015 | |
| CN | 105529531 A | 4/2016 | |
| CN | 105609969 A | 5/2016 | |
| CN | 105742812 A | 7/2016 | |
| CN | 105958201 A | 9/2016 | |
| CN | 106207373 A | 12/2016 | |
| CN | 106207446 A | 12/2016 | |
| EP | 3 131 156 A1 | 2/2017 | |
| EP | 3131156 A1 * | 2/2017 | ............... H04B 1/48 |
| KR | 10-2014-0097849 A | 8/2014 | |
| KR | 10-2016-0046187 A | 4/2016 | |
| KR | 10-2016-0067541 A | 6/2016 | |
| KR | 10-1686784 B1 | 12/2016 | |
| KR | 10-1686787 B1 | 12/2016 | |
| KR | 10-2013588 B1 | 8/2019 | |
| WO | WO 2016/036450 A1 | 3/2016 | |

\* cited by examiner

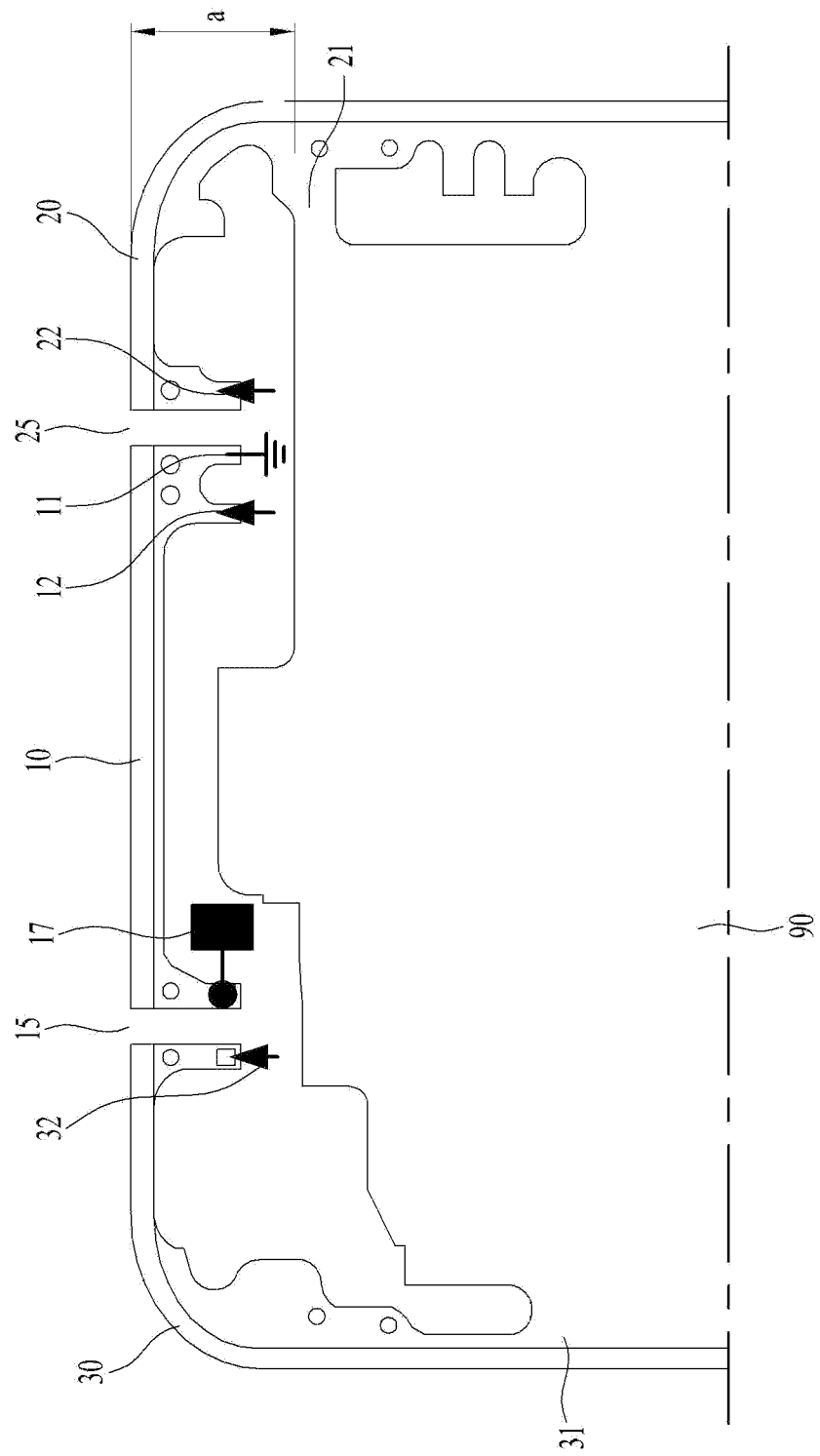

FIG. 4
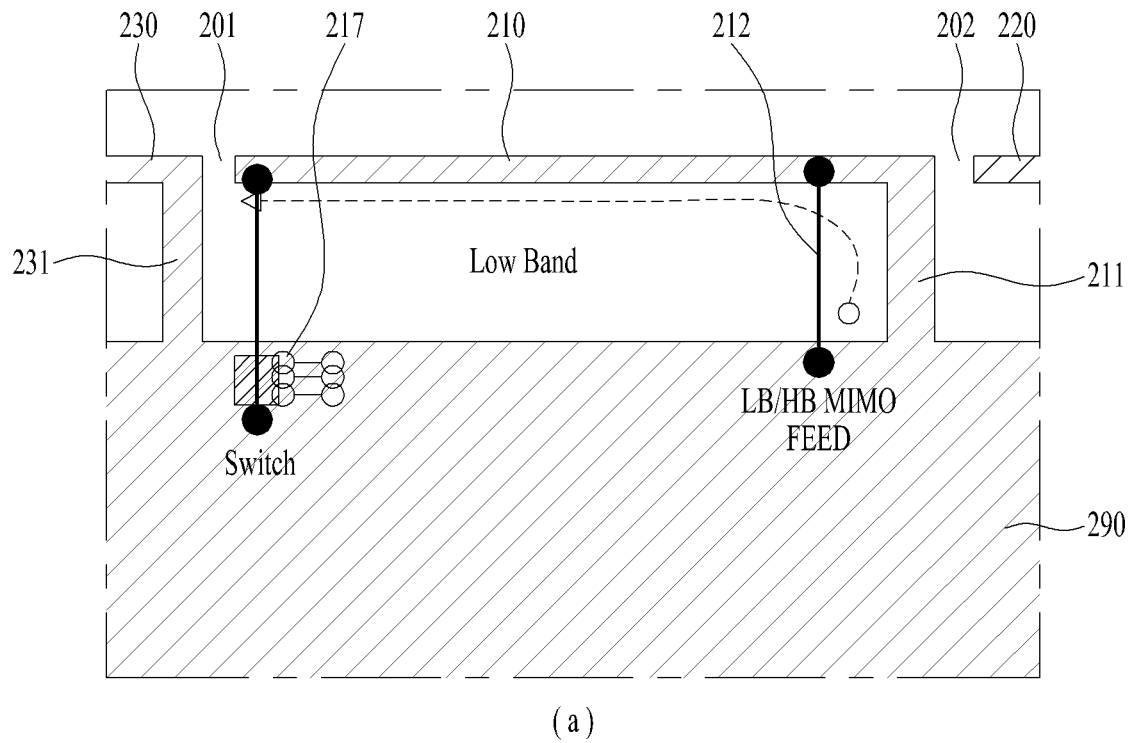
(a)
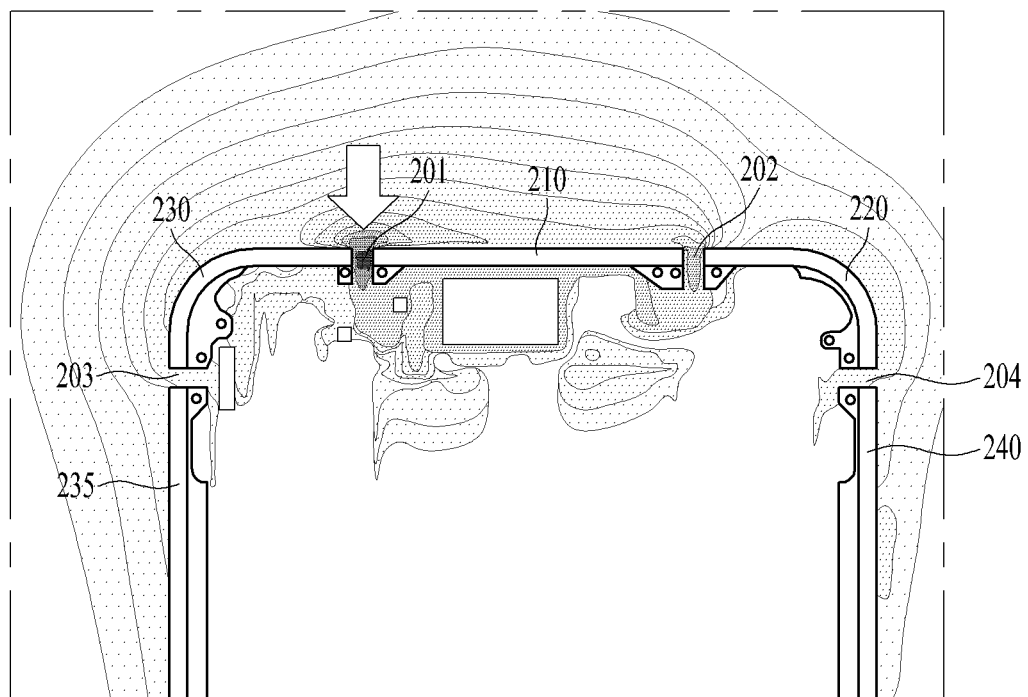
(b)

FIG. 5
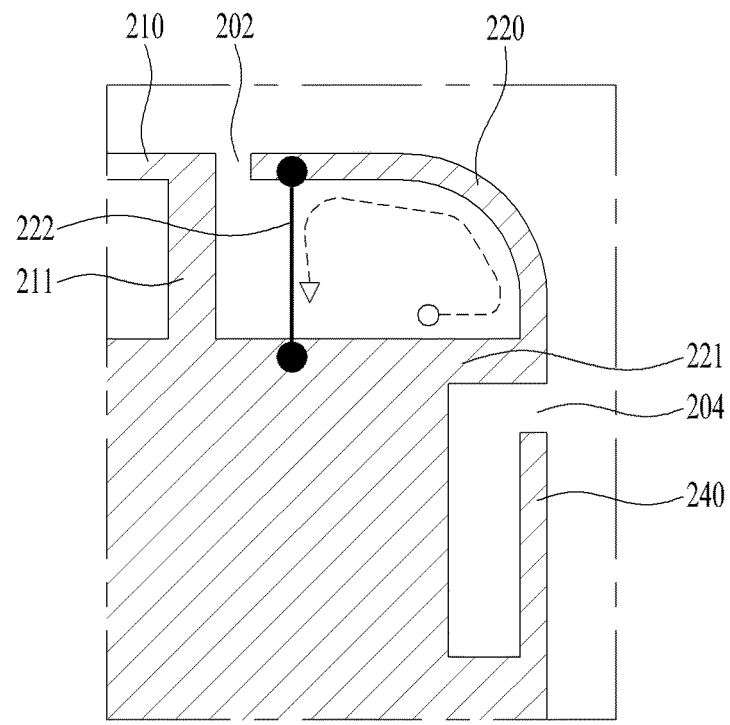
(a)
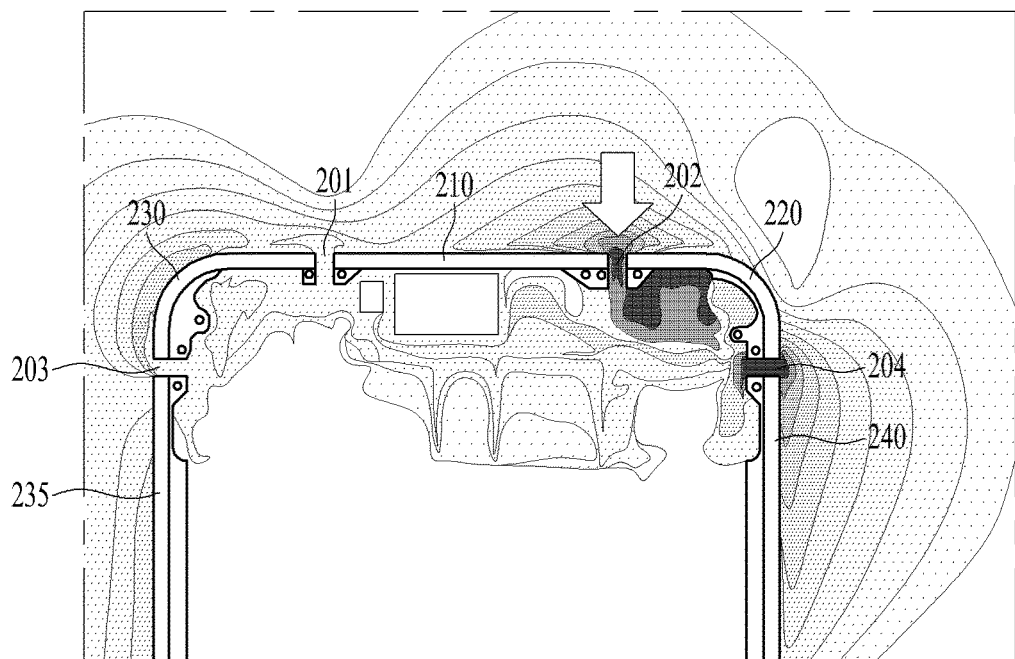
(b)

FIG. 7
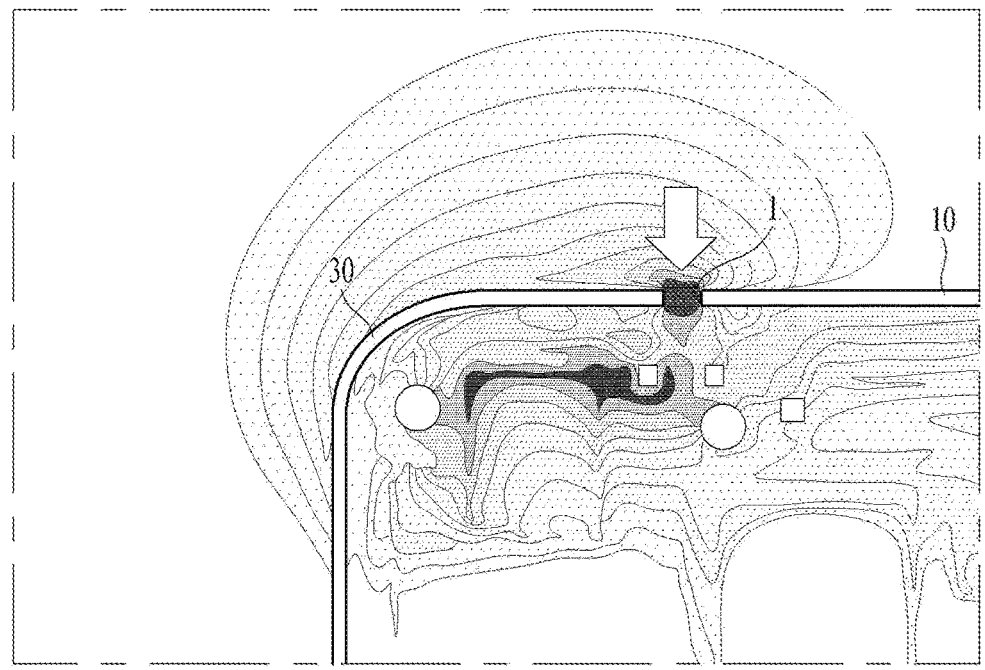
(a)
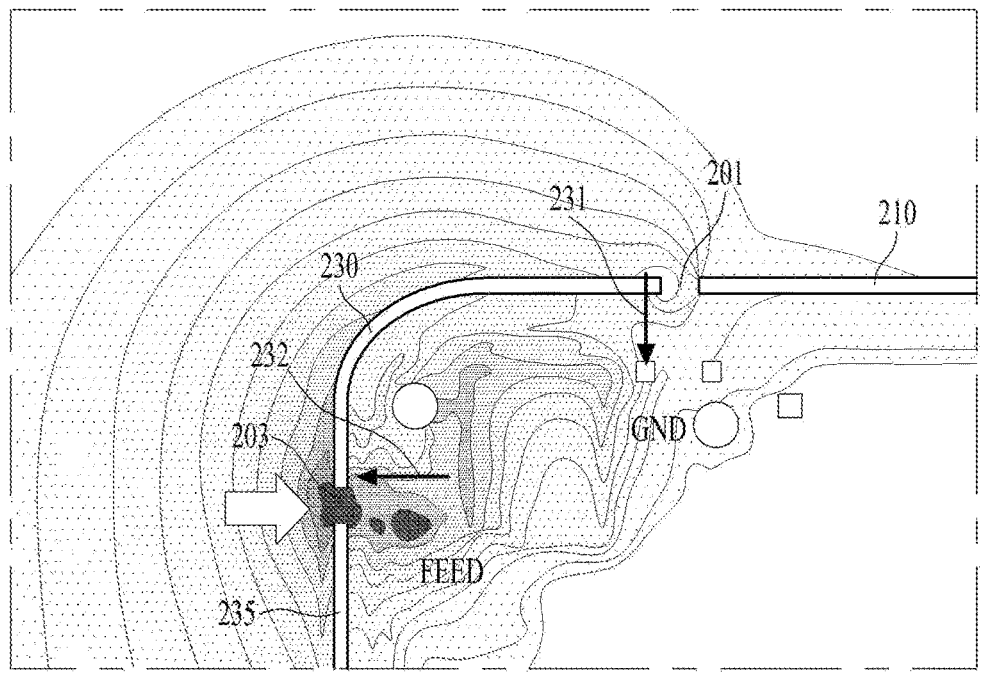
(b)

FIG. 9
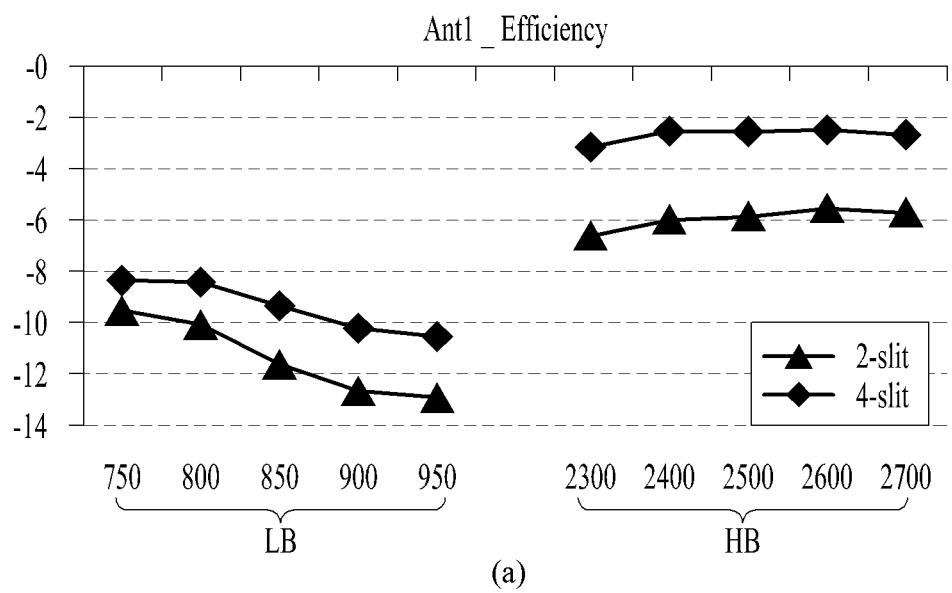
(a)
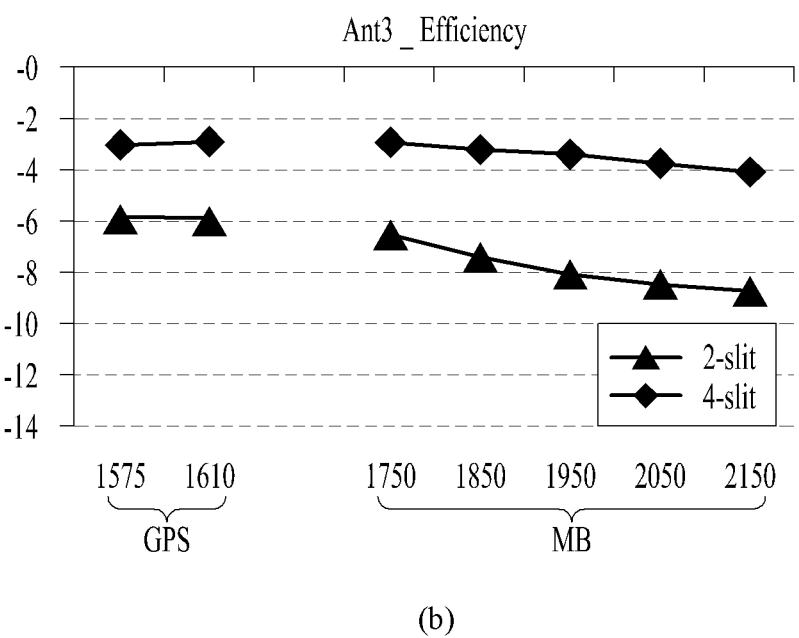
(b)

FIG. 10
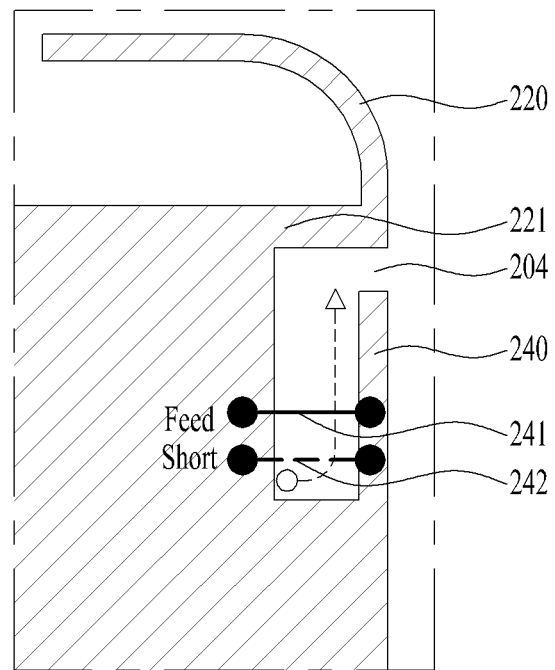
(a)
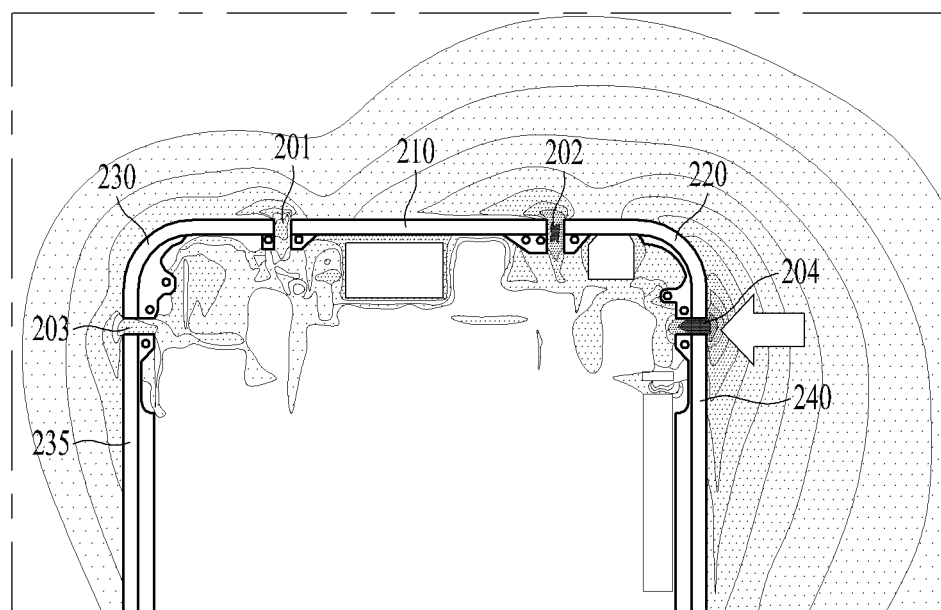
(b)

FIG. 11
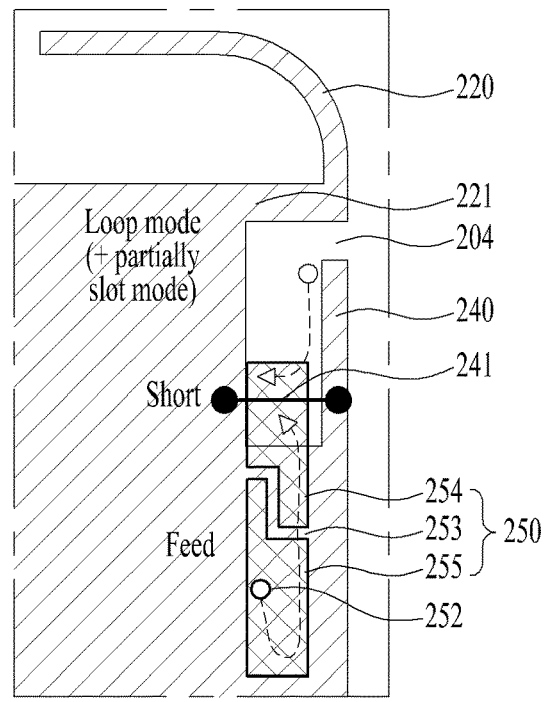
(a)
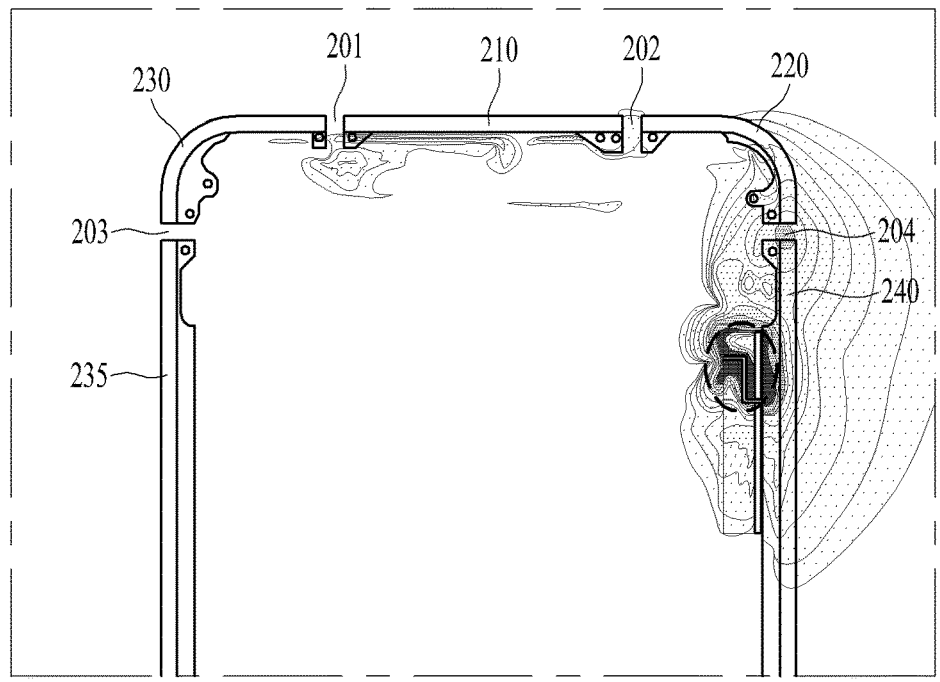
(b)

MOBILE TERMINAL

CROSS-REFERENCE TO RELATED APPLICATIONS

This application is a Continuation of U.S. application Ser. No. 16/480,978 filed on Jul. 25, 2019 (now U.S. Pat. No. 10,951,260 issued on Mar. 16, 2021), which is the National Phase of PCT International Application No. PCT/KR2017/000952, filed on Jan. 26, 2017, all of which are hereby expressly incorporated by reference into the present application.

BACKGROUND OF THE INVENTION

Field of the Invention

The present disclosure relates to a mobile terminal having a structure capable of ensuring antenna performance even when a bezel size is reduced.

Discussion of the Related Art

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device.

As the functions of such terminals are expanded, various types of wireless communication are applied such that data is exchanged in a wireless manner. In order to utilize various wireless communication schemes, antennas having different frequency characteristics are configured. In order to transmit and receive more data, a plurality of antennas operating in one frequency band may be configured to transmit or receive data simultaneously or sequentially.

However, there is a problem that wireless communication is influenced by surrounding electronic components and thus mutual interference occurs. For this reason, a distance from the antenna to other components and the distance and arrangement between the antennas are being studied.

SUMMARY OF THE INVENTION

The present disclosure aims to provide a mobile terminal having antennas in which interferences between the plurality of antennas may be minimized.

In one aspect of the present disclosure, there is provided a mobile terminal comprising: a body for receiving an electronic component therein; a middle frame mounted on the body; a main board mounted on the body; a side case surrounding an edge of the body, wherein the side case includes a plurality of antenna radiators, and a plurality of slits defined between the plurality of antenna radiators; a ground line connected to each of the antenna radiators; and a feeding line for supplying power to each of the antenna radiators, wherein the plurality of slits includes: a first slit and a second slit defined on a first edge of the body; and a third slit and a fourth slit defined on second and third edges of the body respectively, wherein the second and third edges are adjacent to both ends of the first edge respectively, wherein the body has a fourth edge opposite the first edge, wherein the third slit and the fourth slit are closer to the first edge than to the fourth edge.

In one implementation, the plurality of antenna radiators includes: a first antenna radiator including a first end adjacent to the first slit and a second end adjacent to the second slit; a second antenna radiator including a first end adjacent to the second slit and a second end adjacent to the fourth slit; and a third antenna radiator including a first end adjacent to the third slit and a second end adjacent to the first slit, wherein each ground line is connected to the second end of each of the first to third antenna radiators.

In one implementation, the plurality of antenna radiators includes a fourth antenna radiator including a first end adjacent to the fourth slit and a second end connected to the middle frame, wherein the mobile terminal further includes an antenna pattern connected to a ground line connected to the fourth antenna radiator.

In one implementation, the antenna pattern overlaps the middle frame, wherein the antenna pattern includes a first pattern and a second pattern, and a gap defined between the first pattern and second pattern.

In one implementation, the first pattern is connected to the ground line and the second pattern is connected to the feeding line.

In one implementation, the side case further includes an auxiliary radiator including a first end adjacent to the third slit and a second end connected to the middle frame, wherein the auxiliary radiator is not connected to the feeding line.

In one implementation, each of the second antenna radiator and the third antenna radiator is connected to each feeding line at each position thereof adjacent to each first end thereof.

In one implementation, the first antenna radiator is connected to the feeding line at a position thereof adjacent to the second end thereof.

In one implementation, the mobile terminal further includes a switch connected to the first end of the first antenna radiator.

In one implementation, a length of the first antenna radiator is larger than each of a length of the second antenna radiator and a length of the third antenna radiator.

In one implementation, the mobile terminal further includes a display unit on a front face of the body, wherein a distance between an end of the display unit and the first edge is smaller than or equal to 6 mm.

In one implementation, the main board further includes a ground connected to the middle frame, wherein each ground line is connected to the middle frame or to the ground.

In one implementation, each ground line connects the middle frame to each antenna radiator, wherein each ground line is integral with the middle frame and the side case.

According to the present disclosure, the mobile terminal may improve the antenna performance by minimizing the interference between the antenna radiators transmitting and receiving the signals at each frequency.

Further, even when the size of the display unit is increased, the antenna performance can be secured, which can reduce a size of the top bezel above the display unit.

Further, a scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

FIG. 2 shows an antenna radiator of a conventional mobile terminal.

FIG. 4 including FIGS. 4(a) and 4(b) are diagrams describing an operation and performance of a first antenna radiator of a mobile terminal according to an embodiment of the present disclosure.

FIG. 5 including FIGS. 5(a) and 5(b) are views describing an operation and performance of a second antenna radiator of a mobile terminal according to an embodiment of the present disclosure.

FIGS. 6(a) and 6(b) are views describing the operation of a third antenna radiator of the mobile terminal according to an embodiment of the present disclosure.

FIG. 7 including FIGS. 7(a) and 7(b) illustrate the distribution of the electric field (e-field) generated by the antenna radiator at a middle frequency for each of the conventional mobile terminal and the mobile terminal according to the present disclosure.

FIG. 9 including FIGS. 9(a) and 9(b) are graphs showing the isolation between the first antenna radiator and the third antenna radiator of the mobile terminal according to the present disclosure.

FIG. 10 including FIGS. 10(a) and 10(b) are diagrams describing the operation and the distribution of the electric field of a fourth radiator of the mobile terminal according to an embodiment of the present disclosure.

FIG. 11 including FIGS. 11(a) and 11(b) show the antenna pattern of the mobile terminal according to an embodiment of the present disclosure.

DETAILED DESCRIPTION OF THE EMBODIMENTS

Figure 1A:
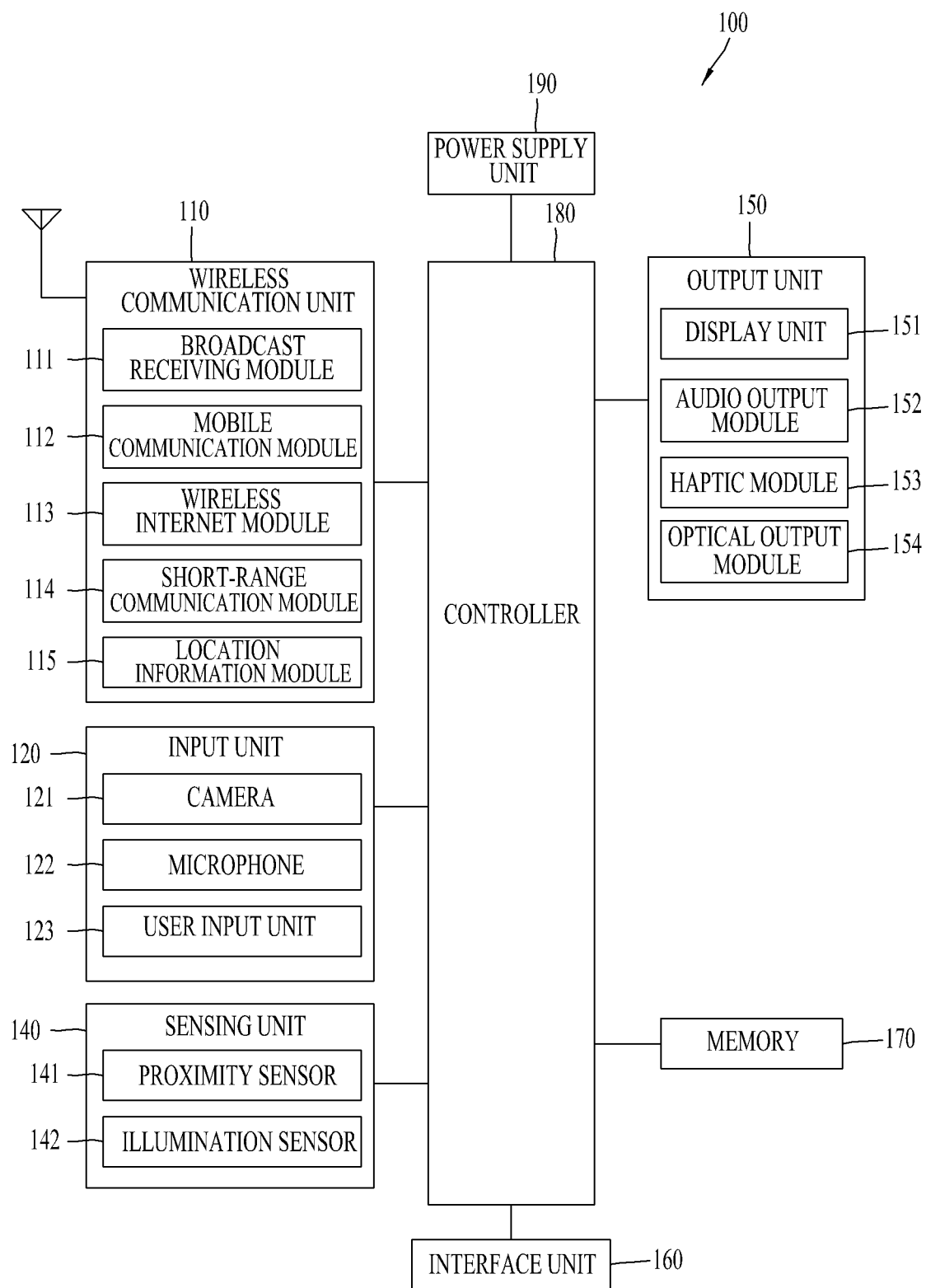
FIG. 1A is a block diagram of a mobile terminal in accordance with the present disclosure.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
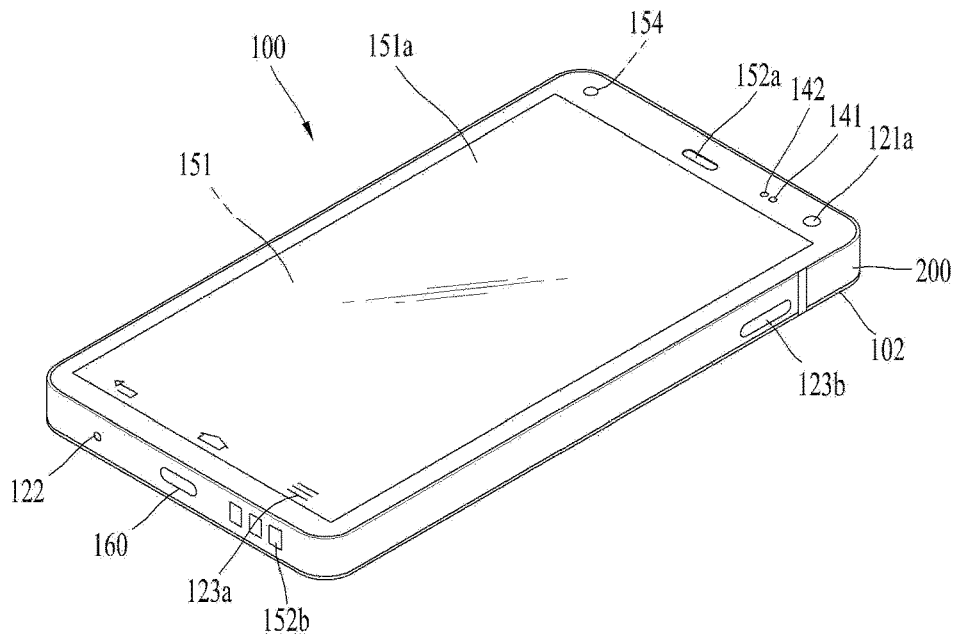
FIGS. 1B and 1C are conceptual views of one example of the mobile terminal, viewed from different directions.
Figure 1C:
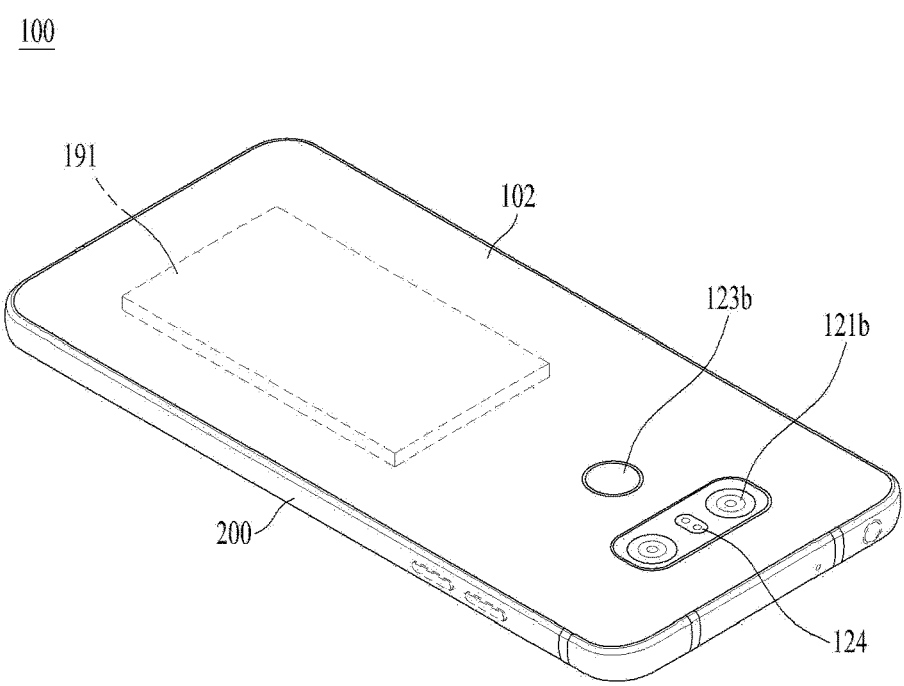

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. Referring now to FIG. 1A, the mobile terminal 100 is shown having wireless communication unit 110 configured with several commonly implemented components. It is understood that implementing all of the illustrated components is not a requirement, and that greater or fewer components may alternatively be implemented.

More specifically, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, the sensing unit 140 may alternatively or additionally include other types of sensors or devices, such as a proximity sensor 141 and an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output, or activating application programs stored in the memory 170.

To drive the application programs stored in the memory 170, the controller 180 may be implemented to control a predetermined number of the components mentioned above in reference with FIG. 1A. Moreover, the controller 180 may be implemented to combinedly operate two or more of the components provided in the mobile terminal 100 to drive the application programs.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Some or more of the components may be operated cooperatively to embody an operation, control or a control method of the mobile terminal in accordance with embodiments of the present disclosure. Also, the operation, control or control method of the mobile terminal may be realized on the mobile terminal by driving of one or more application problems stored in the memory 170.

Hereinafter, referring to FIG. 1, the components mentioned above will be described in detail before describing the various embodiments which are realized by the mobile terminal 100 in accordance with the present disclosure.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000(Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sensing unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data max be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.).

The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 may be provided with the power supplied by an external power source and the power supplied therein under the control of the controller 180 so as to supply the needed power to each of the components. The power supply unit 190 may include a battery. The battery may be a built-in type which is rechargeable and detachably loaded in the terminal to be charged.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like).

However, such teachings with regard to a particular type of mobile terminal will generally apply to other types of mobile terminals as well.

Here, the terminal body may be understood to refer to the concept of this bore a mobile terminal 100 to at least one of the aggregate.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

A middle frame 290 (see FIG. 3) may be configured to support the backside of the display unit 151 for rigidity of the mobile terminal 100. The middle frame 290 may include a metallic material for the rigidity. Further, the middle frame may not only provide the rigidity to the mobile terminal and but also serve as a ground with a large-area and made of a conductive material. The middle frame may be connected to each of components for grounding of the electronic components such as antennas.

The middle frame 290 may be configured so as not to be exposed to the outside and may be integrally formed with a front case located on the front surface of the body or a side case 200 located on the side surface thereof.

As the multimedia function is expanded, the size of the display unit 151 is increased and the size of the bezel located around the active region of the display unit 151 is gradually decreasing. In particular, the top portion requires installation spaces for the camera 121, the sound output unit 152, the proximity sensor 141, and the like to be positioned, and physical buttons are disposed on the lower end. This may limit the size expansion of the display unit 151.

However, in recent years, the size of each component is minimized and a user input unit 123 using a soft key is implemented instead of a physical button, so that a soft key is displayed on the screen only when necessary, and if unnecessary, the soft key disappears. Thus, the size of the screen can be increased.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

The cases 101, 102, 103 may be formed by injection-molding synthetic resin or may be formed of a metal, for example, stainless steel (STS), aluminum (Al), titanium (Ti), or the like.

The mobile terminal 100 of the present embodiment includes the side case 200 surrounding a side surface. The side case 200 may include a metal material. However, for wireless communication performance, a portion of the side case may include non-metallic materials. As shown in FIGS. 1B and 1C, the side case 200 includes a plurality of antennas 230 and 240 (see FIG. 2) made of a conductive material such as metal, and nonmetallic slits 203 and 204 (See FIG. 2) arranged between the antennas.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include the display unit 151, the first and second audio output modules 152a and 152b, the proximity sensor 141, the illuminance sensor 142, the optical output module 154, the first and second cameras 121a and 121b, the first and second manipulation units 123a and 123b, the microphone 122 and the interface unit 160.

It will be described for the mobile terminal as shown in FIGS. 1B and 1C. The display unit 151, the first audio output module 152a, the proximity sensor 141, an illumination sensor 142, the optical output module 154, the first camera 121a and the first manipulation unit 123a are arranged in front surface of the terminal body, the second manipulation unit 123b, the microphone 122 and interface unit 160 are arranged in side surface of the terminal body, and the second audio output modules 152b and the second camera 121b are arranged in rear surface of the terminal body.

It is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit 123c may be located on the rear surface of the terminal body. The rear input unit 123c can be manipulated by a user to provide input to the mobile terminal 100. The input may be used in a variety of different ways. For example, the rear input unit 123c may be used by the user to provide an input for power on/off, start, end, scroll, control volume level being output from the first or second audio output modules 152a or 152b, switch to a touch recognition mode of the display unit 151, and the like. The rear input unit 123c may be configured to permit touch input, a push input, or combinations thereof.

The rear input unit 123c may be located to overlap the display unit 151 of the front side in a thickness direction of the terminal body. As one example, the rear input unit 123c may be located on an upper end portion of the rear side of the terminal body such that a user can easily manipulate it using a forefinger when the user grabs the terminal body with one hand. Alternatively, the rear input unit 123c can be positioned at most any location of the rear side of the terminal body.

Embodiments that include the rear input unit 123c may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be movable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

A flash 124 is shown located adjacent to the second camera 121b. When an image of a subject is captured with the camera 121b, the flash 124 may illuminate the subject.

The second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (see FIG. 1A), may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen Hereinafter, embodiments related to a control method that may be implemented in the mobile terminal configured as described above will be described with reference to the accompanying drawings. It will be apparent to those skilled in the art that the present disclosure may be embodied in other specific forms without departing from the spirit or essential characteristics of the present disclosure.

As the multimedia function becomes important, the wireless communication technology performed by the mobile terminal is performed in various forms, for example, in a short-range, long distance or inter-device manner. In this connection, because different frequency bands are used, different antenna radiators should be used.

In recent years, as wireless communication technology has developed, a large amount of data has been transmitted and received. To this end, it is possible to use a multiple input/multiple output (MIMO) technique for simultaneously or sequentially transmitting/receiving signals at the same frequency band. This may increase the number of antennas of the base station and the mobile terminal 100 to two or more antennas to transmit data along a plurality of paths and may detect a signal received along each of the paths by a receiving end to reduce interference therebetween and reduce the transmission rate of each path. In order to apply the MIMO technique, it is necessary to increase the number of antenna radiators within a limited size of the mobile terminal 100.

Because the antenna radiator generates an electromagnetic field, it is affected by adjacent conductive materials. Thus, interference may occur between adjacent antenna radiators, which may cause degradation of radio signal performance. Accordingly, the antenna radiators may be attached to the case to be disposed on the outer side of the mobile terminal 100, or the case itself may be used as an antenna.

As the size of the display unit increases, the size of the left and right bezels of the mobile terminal 100 is almost zero. The side cases on the left and right to the display unit may not function as antenna radiators reliably. For this reason, each of the top and bottom portions of the mobile terminal 100 may act as an antenna radiator.

FIG. 2 shows the antenna radiator of the conventional mobile terminal. A middle frame 90 and side cases 10, 20, 30, 15 and 25 of the top portion of the mobile terminal are shown in FIG. 2. The middle frame 90 and the side cases 10, 20, 30, 15, and 25 may be spaced apart from each other. Alternatively, they may be partially connected to each other to form an integral body.

Each of the side cases may be made of a conductive material such as metal. Alternatively, each of the side cases may be partially made of nonconductive material and may be partially made of the conductive material. In this case, the nonconductive material separates adjacent conductive material portions from each other such that the conductive material portion between the adjacent nonconductive material portions defines an antenna radiator. Slits 15 and 25 may be defined between the antenna radiators 10, 20 and 30. The slits 15 and 25 may be filled with nonconductive materials to form the side case. (In the figure, the nonconductive material filled in the slits 15 and 25 is omitted but only the antenna radiator is shown).

The conventional side cases 10, 20, 30, 15 and 25 have the two slits 15 and 25 at the top of the side cases and one or two slits defined in the bottom thereof. A plurality of radiators are disposed on each of the top and bottom. A side case in a middle portion (left and right sides of the mobile terminal) is connected to the middle frame 90 and thus is grounded. Thus, the antenna radiators 10, 20 and 30 are positioned at each of the longitudinal ends (top and bottom) of the mobile terminal.

Recently, in order to increase the size of the display unit, the arrangement of the camera, sound output module and various sensors located in the top bezel has been changed and the sizes thereof have been reduced. Thus, the size of the top bezel that has reached 13 mm may be reduced to 6 mm or smaller, which is about one half of 13 mm. However, even though the antenna radiators 10, 20, and 30 located at the top portion are spaced apart from the middle frame 90, the wireless communication performance thereof is degraded as the distance between the antenna radiators 10, 20, and 30 and the display unit made of the conductive material and the middle frame 90 made of the conductive material becomes smaller. Therefore, reducing the size (a) of the top bezel above the display unit may further degrade the antenna performance.

Figure 3:
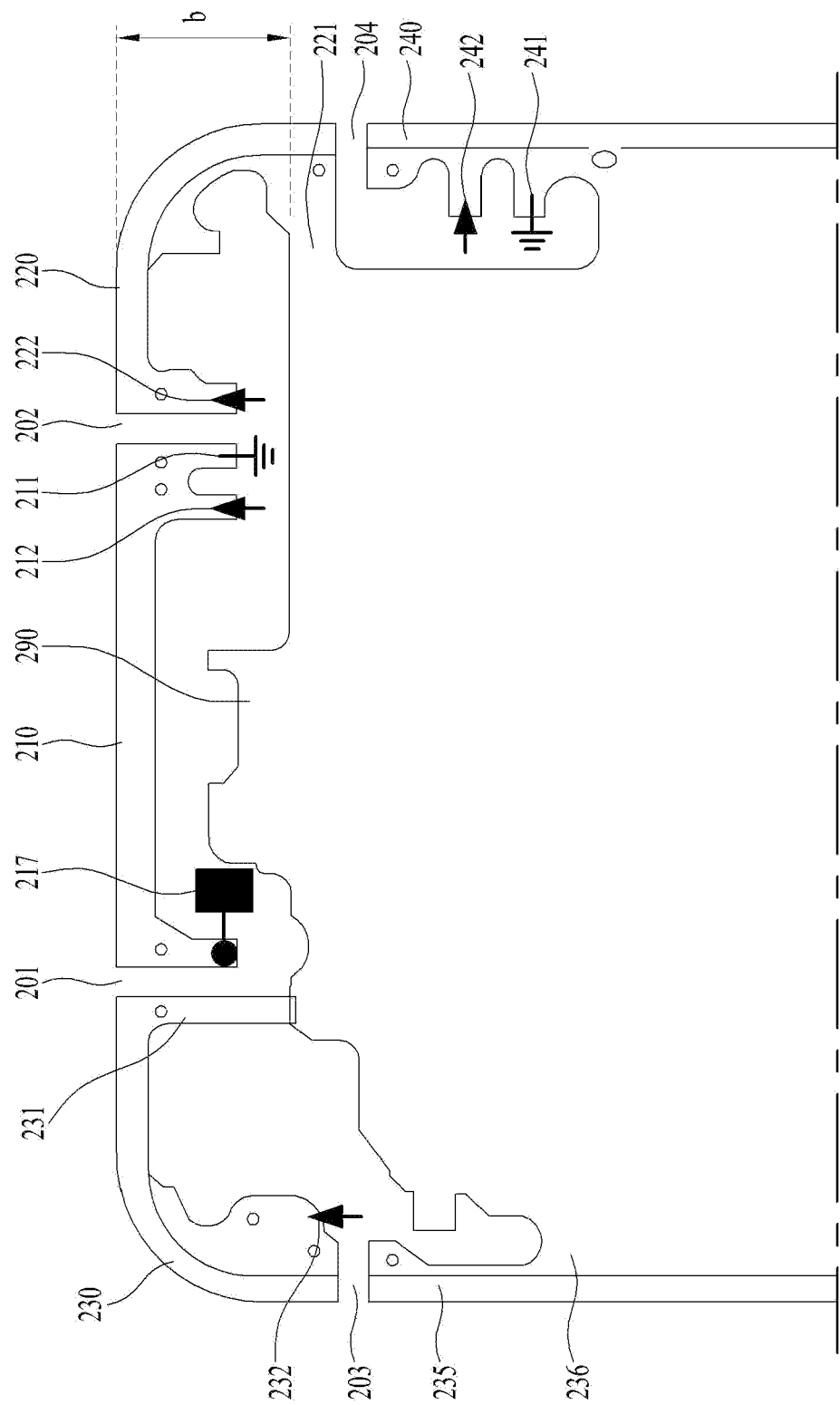
FIG. 3 shows a radiator of a mobile terminal according to one embodiment of the present disclosure.

FIG. 3 is a view illustrating a radiator of the mobile terminal 100 according to an embodiment of the present disclosure. A purpose of the present disclosure is to provide a structure of the antenna radiators 210, 220, 230 and 240 by which the radio communication performance is secured even when the size of the top bezel above the display unit 151 is reduced to 6 mm or smaller such that the distances between the display unit 151 and the middle frame 290 and the antenna radiators 210, 220, 230 and 240 become smaller.

The present disclosure provides a structure of the antenna radiators 210, 220, 230 and 240 to maximize the energy radiated to the outside of the mobile terminal 100 by minimizing the interferences between the neighboring antenna radiators 210, 220, 230 and 240. Referring to FIG. 3, unlike the conventional side case of FIG. 2 above, a side case 200 according to the present disclosure may have an increased number of slits 201, 202, 203 and 204. Thus, the number of antenna radiators 210, 220, 230 and 240 may increase. Further, positions where the antenna radiators 210, 220, 230 and 240 mainly radiate the energy may be identified.

The side case 200 of the mobile terminal 100 according to the present embodiment includes a plurality of antenna radiators 210, 220, 230 and 240 separated from each other by four slits 201, 202, 203 and 204 at the top of the side case 200. Further, the side case 200 of the mobile terminal 100 according to the present embodiment includes a plurality of antenna radiators separated from each other by slits at the bottom of the side case 200. In this connection, the antenna radiators for mobile communication arranged at the bottom of the side case may be separated from the antenna radiators 210, 220, 230 and 240 at the top of the side case by the middle frame 290 located in the middle of the mobile terminal 100. Thus, the structure of the antenna radiators located at the bottom of the side case is not considered. For convenience of description, the following description will be made based on the example where the antenna radiators 210, 220, 230, and 240 are located at the top of the mobile terminal 100. However, the present disclosure is not limited thereto. The antenna radiators may be located at the bottom of the mobile terminal 100.

The plurality of antenna radiators 210, 220, 230 and 240 are separated from each other by the plurality of slits 201, 202, 203 and 204. Each of the slit 201, 202, 203 and 204 may be filled with a non-conductive material in a dual injection scheme. A length of each antenna radiator 210, 220, 230 and 240 may vary depending on the wavelength of a signal to be transmitted/received. A matching circuit may be connected thereto for frequency matching. The antenna radiators 210, 220, 230 and 240 may be connected to other parts made of a conductive material to match the resonance frequency.

The slits 201, 202, 203 and 204 may include a first slit 201 and a second slit 202 formed in a top edge (first edge) of the mobile terminal 100, and a third slit 203 and a fourth slit 204 defined respectively in left and right edges (second edge and third edge) connected to both ends of the first edge respectively. A fourth edge opposite the first edge may be a bottom edge of the mobile terminal 100 in this embodiment.

The first to fourth antenna radiators 210 to 240 partitioned from each other by the first to fourth slits 201 to 204 may be included in the side case. The first antenna radiator 210 includes a first end adjacent to the first slit 201 and a second end adjacent to the second slit 202. The second antenna radiator 220 includes a first end adjacent to the second slit 202 and a second end adjacent to the fourth slit 204.

The third antenna radiator 230 includes a first end adjacent to the third slit 203 and a second end adjacent to the first slit 201. The fourth antenna radiator 240 includes a first end adjacent to the fourth slit 204 and a second end connected to the middle frame 290.

The first end of the first antenna radiator 210 and the second end of the third antenna radiator 230 face away each other with the first slit 201 therebetween. The second end of the first antenna radiator 210 and the first end of the second antenna radiator 220 face away each other with the second slit 202 therebetween. The second end of the second antenna radiator 220 and the first end of the fourth antenna radiator 240 face away each other with the fourth slit 204 therebetween.

In this connection, the second ends of the antenna radiators 210, 220, 230 and 240 may be connected to ground lines 211, 221, 231 and 241 respectively to ground the antenna radiators. The ground lines 211, 221, 231, and 241 may be directly connected to the middle frame 290 serving as a ground or may be indirectly connected to the middle frame 290 via a main board 181.

The ground lines 211, 221, 231 and 241 are connected to the second ends of the antenna radiators 210, 220, 230 and 240 respectively such that each first end is open to the ground 290, and each second end defines a closed slot with the ground 290. The first antenna radiator 210 to the fourth antenna radiator 240 may be configured such that one of both ends thereof defining a corresponding slit 201, 202, 203 or 204 therebetween is connected to the corresponding ground line 211, 221, 231 or 241 while the other of the both ends is not connected to the ground line 211, 221, 231, or 241 and thus is open.

The antenna radiators 210, 220, 230 and 240 are grounded via the ground lines 211, 221, 231 and 241 connected to the middle frame 290. Power is supplied to the antenna radiators 210, 220, 230 and 240 from the main board 181 through feeding lines 212, 222, 232 and 242. Depending on the locations where the ground lines 211, 221, 231 and 241 and the feeding line 212, 222, 232 and 242 are connected to the antenna radiator 210, 220, 230 and 240 respectively, the current flow may vary to implement varying types of antennas.

Generally, in the portions of the radiators where the ground lines 211, 221, 231, and 241 connected to the ground 290 are connected thereto, the signal does not spread widely, such that mutual interference between neighboring radiators become small. However, in the ends of the radiators where the ground lines 211, 221, 231, and 241 connected to the ground 290 are not connected thereto, the radiation of the entire magnetic field is concentrated thereon because of the nature that the electrons are concentrated on an end of the conductor.

Therefore, according to the present disclosure, in each first end where each of the plurality of antenna radiators 210, 220, 230 and 240 are not connected to each of the ground lines 211, 221, 231 and 241, the electromagnetic field shows the strongest intensity. Since the first ends of the first antenna radiator 210 to the fourth antenna radiator 240 are spaced apart from each other, interferences between the antenna radiators 210, 220, 230 and 240 may be minimized.

The first antenna radiator 210 generates the largest electric field around the first slit 201. The second antenna radiator 220 generates the largest electric field around the second slit 202. The third antenna radiator 230 generates the largest electric field around the third slit 203. The fourth antenna radiator 240 generates the largest electric field around the fourth slit 204.

In the conventional mobile terminal shown in FIG. 2 implementing the three antenna radiators 10, 20, and 30 separated from each other via the two slits 15 and 25, the first antenna radiator 10 and the second antenna radiator 20 simultaneously radiate energy around the single slit 15 to cause severe interference. However, the antenna radiators 210, 220, 230 and 240 in accordance with the present disclosure may have minimized interferences with each other since the maximum radiations occur at different positions.

FIG. 4 is a view for explaining the operation and performance of the first antenna radiator 210 of the mobile terminal 100 according to an embodiment of the present disclosure. FIG. 4a shows the current flow. FIG. 4b shows the electric field at the resonant frequency of the first antenna radiator 210 when power is applied to the feeding line 212.

Referring to FIG. 4a, the first antenna radiator 210 is located at the first edge and may be relatively longer than other radiators. Thus, the first antenna radiator 210 may transmit and receive a signal of a low frequency band corresponding to a band of the longest wavelength. The first antenna radiator 210 is connected to the ground line 211 at the second end thereof adjacent to the second slit 202 and thus is grounded. The feeding line 212 is connected to between the first end and the second end of the first antenna radiator 210 to supply power thereto. When the feeding line 212 is disposed adjacent to the ground line 211, as shown in FIG. 4a, the current flows in the L-shape. Thus, this antenna is called the ILA (Inverted L-Type Antenna).

The ILA (Inverted L Type Antenna) has a basic operation mode in which the distance from the position where the feeding line 212 is connected to the antenna radiator 210 to the first end of the first antenna radiator 210 corresponds to $\lambda/4$ of the resonance frequency. In the basic operation mode, a switch may be used to tune the resonance frequency, or the resonance frequency may be adjusted using conductive materials.

When transmitting/receiving low-frequency signals, the bandwidth is narrow. Thus, for the antennas to operate at different frequencies for different countries or operators, a switch 217 for adjusting the frequency may be further included. The switch 217 for the frequency tuning (resonance frequency adjustment) in the low frequency band may be connected to the first end of the first antenna radiator 210. (Although the main board 181 is omitted in the figure, the switch 217 and the feeding line 212 are connected to the main board 181.)

The first antenna radiator 210 may transmit and receive signals in a high frequency band. Since the signal at the high frequency band has a short wavelength, the length of the first antenna radiator 210 is larger than the wavelength of the high frequency band so that the signal can be transmitted and received at the high frequency band.

Referring to FIG. 4b, the darker the color, the stronger the electric field. The strongest electric field is formed in the first slit 201 adjacent to the first end of the first antenna radiator 210. Because the second end is connected to the middle frame 290 via the ground line 211, the electric field strength at the first slit 201 is relatively larger than that at the second slit 202.

FIG. 5 is a diagram for explaining operation and performance of the second antenna radiator 220 of the mobile terminal 100 according to an embodiment of the present disclosure. FIG. 5a shows the current flow. FIG. 5b shows the electric field at the resonant frequency of the first antenna radiator 210 when power is applied to the feeding line 222.

Referring to FIG. 5, the second end of the second antenna radiator 220 is connected to the middle frame 290 via the ground line 221. The first end thereof is powered via the feeding line 222. The second antenna radiator 220 is of a slot antenna type in which a current flows in a loop shape along the perimeter of the slot such that the antenna transmits and receives signals. The second antenna radiator 220 can transmit/receive signals at a middle frequency (Mid Band) or a high frequency (High Band).

Referring to FIG. 5b, the darker the color, the stronger the electric field. The strongest electric field is formed at the second slit 202 adjacent to the first end of the second antenna radiator 220. Since the second end of the antenna radiator 220 is connected to the middle frame 290 via the ground line 221, the intensity of the electric field appears larger in the second slit 202 than in the fourth slit 204.

Figure 6:
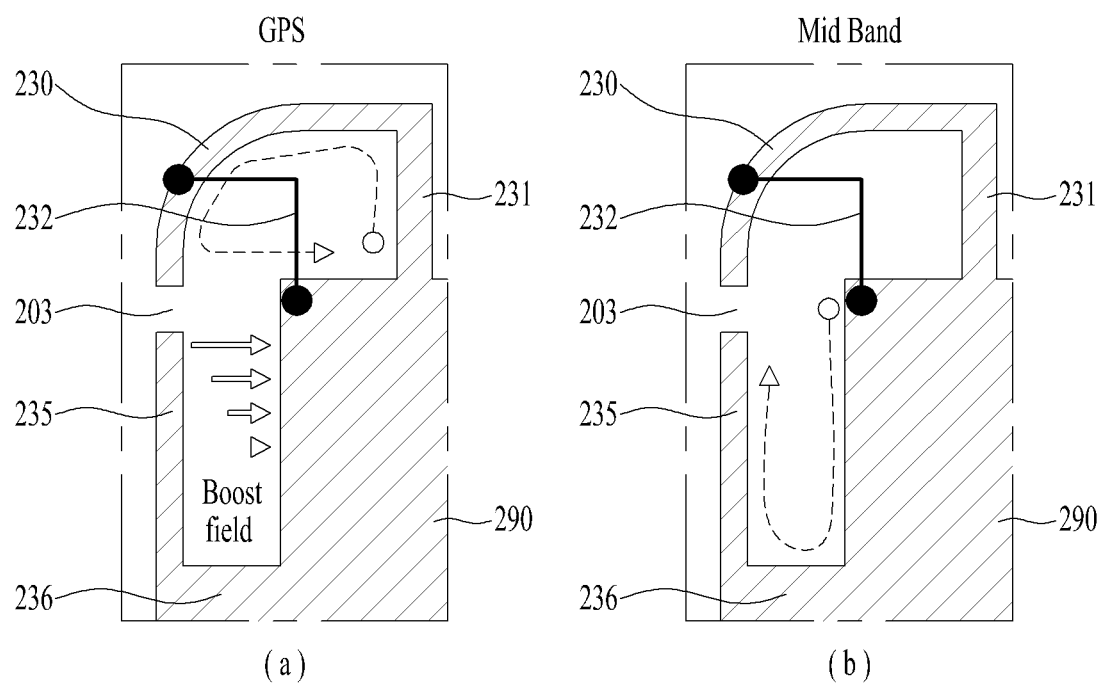
FIG. 6 including

FIG. 6 is a view for explaining the operation of the third antenna radiator 230 of the mobile terminal 100 according to an embodiment of the present disclosure. FIG. 7 shows the distribution of the electric field (e-field) generated by the antenna radiator at a middle frequency for each of the conventional mobile terminal 100 and the mobile terminal 100 according to the present disclosure.

The third antenna radiator 230 transmits and receives signals to and from the GPS at the middle frequency band. The GPS uses signals in the 1.5 GHz band. The middle frequency may be slightly higher than 1.7 GHz to 2.1 GHz.

The third antenna radiator 230 in accordance with the present disclosure is different from the conventional antenna radiator shown in FIG. 2 in terms of the positions where the ground line 231 and the feeding line 232 are connected thereto and in that the third slit 203 is formed at the first end to which the feeding line 232 is connected.

The ground line 231 is connected to the second end of the third antenna radiator 230 adjacent to the first slit 201. The feeding line 232 is connected to the first end of the third antenna radiator 230 adjacent to the third slit 203 which is not present in the conventional mobile terminal. Thus, the interference between the third antenna radiator 230 and first antenna radiator 210 may be reduced due to the feeding line 232.

Further, an auxiliary radiator 235 facing away the first end of the third antenna radiator 230 in accordance with the present disclosure may be included in the side case. A location (second end 236) at which the auxiliary radiator 235 is connected to the middle frame 290 and thus is grounded may be a location at which the auxiliary radiator 235 is spaced apart from the third antenna radiator 230. The first end adjacent to the third slit 203 is open.

The auxiliary radiator 235 is not directly connected to the feeding line 232. When power is applied to the third antenna radiator 230 through the feeding line 232 to generate the electric field, this affects the auxiliary radiator 235 to allow current to flow therein.

In the GPS frequency band of 1.5 GHz, loop current flows along the slot formed by the third antenna radiator 230. The auxiliary antenna acts as a booster to improve the performance of the third antenna radiator 230. In the middle frequency band of 1.7 to 2.2 MHz, current flows in the current the auxiliary radiator 235 to transmit and receive signals.

FIG. 7a shows the electric field distribution when the conventional antenna radiator shown in FIG. 2 transmits and receives signals at 1.5 GHz. FIG. 7b shows the electric field distribution when the third antenna radiator 230 in accordance with the present disclosure shown in FIG. 5 transmits and receives signals at 1.5 GHz. Since the conventional side case does not include the third slit 203, the electric field mainly concentrates on the top slit 1. However, in the third antenna radiator 230 according to the present disclosure, the electric field concentrates on a position adjacent to the third slit 203.

Figure 8:
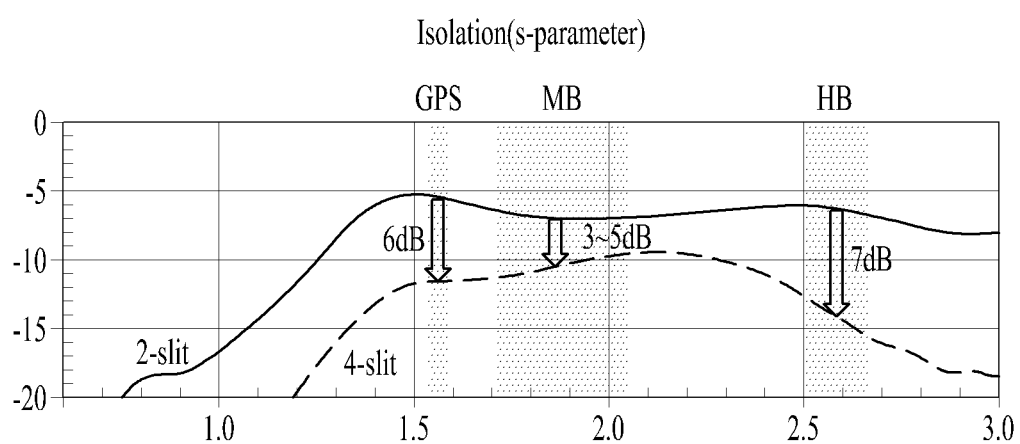
FIG. 8 shows the wireless communication performance of the conventional mobile terminal and the wireless communication performance of the mobile terminal according to the present disclosure.

The interference between the first antenna radiator 210 and the third antenna radiator 230 may be reduced such that the wireless communication performance of the first antenna radiator 210 and the wireless communication performance of the third antenna radiator 230 may be improved. FIG. 8 is a graph showing isolation between the first antenna radiator 210 and the third antenna radiator 230 of the mobile terminal 100 according to the present disclosure. FIG. 9 is a diagram illustrating the wireless communication performance of the conventional mobile terminal 100 and the wireless communication performance of the mobile terminal 100 according to the present disclosure.

The first antenna radiator 210 transmits and receives signals in the low frequency range of 750 to 950 MHz and the high frequency range of 2.3 GHz to 2.7 GHz. The third antenna radiator 230 transmits and receives GPS signals at 1575 to 1610 MHz and transmits and receives signals at the middle frequency band 1750 GHz to 2150 GHz. In the graph of FIG. 8, the influence between the two antenna radiators is smaller ant thus the performance of the antennas is excellent as the curve is located at a lower level. In the graph of FIG. 9, the performance of the antennas is excellent as the curve is located at a higher level.

The structure is modified such that the antenna radiators 210 and 230 have the open ends which do not face each other, in order that the shapes of the electromagnetic field fields generated by the first antenna radiator 210 and the third antenna radiator 230 are not overlapped with each other. Thus, the first antenna radiator 210 and the third antenna radiator 230 in accordance with the present disclosure have better performance than the conventional first antenna radiator 10 and the third antenna radiator 30.

As shown in FIG. 8, in the frequency band of the GPS signal, the isolation is improved by 6 dB. In the middle frequency band, isolation is improved by 3 to 5 dB. Isolation is improved by 7 dB in the high frequency band. The efficiency of the radio communication of the first antenna radiator 210 and the second antenna radiator 220 is improved as shown in FIG. 9.

FIG. 10 is a view for explaining operation and electric field distribution of a fourth radiator of the mobile terminal 100 according to an embodiment of the present disclosure. The fourth antenna radiator 240 in accordance with the present disclosure has an open first end near the fourth slit 204. The second end thereof is connected to the middle frame 290 and thus is grounded. The second antenna radiator 220 has the second end adjacent to the fourth slit 204 connected to the middle frame 290 through the ground line 231. Thus, interference between the second antenna radiator 220 and the fourth antenna radiator 240 is reduced.

The fourth antenna radiator 240 in accordance with the present disclosure performs wireless communication in WiFi and Bluetooth schemes. The function performed by the conventional second antenna radiator 220 shown in FIG. 2 is performed by the fourth antenna radiator 240 in accordance with the present disclosure. The second antenna radiator 220 in accordance with the present disclosure transmits and receives a middle frequency and a high frequency signal. In accordance with the present disclosure, the slits more by two than the slits in the conventional case may be present to increase the number of antenna radiators and minimize interferences between the antenna radiators.

The fourth antenna radiator 240 may have the second end connected to the middle frame 290. Thus, a portion thereof connected to the middle frame 290 may serve as a ground line. Alternatively, an additional ground line 241 may be present. In this case, the position of the feeding line 232 near the first end determines the resonance frequency of the fourth antenna radiator 240.

The mobile terminal further includes the feeding line 232 disposed adjacent to the ground line 241. Current flows along the fourth antenna radiator 240 from the ground line 241. Thus, radiation mainly occurs at the fourth slit 204 as shown in FIG. 10b, such that at the fourth slit 204, the intensity of the electric field is the greatest.

As the multimedia function increases, the amount of data transmission using WiFi and Bluetooth is also increasing. Thus, in addition to the mobile communication antenna, the WiFi antenna may have an antenna radiator to increase data transmission. However, as described above, it is difficult to space the antenna radiators from each other in a large distance due to the limitation of the mounting space.

When antenna radiators transmitting and receiving signals at different frequency bands are arranged adjacent to each other, interference therebetween may occur. Further, mutual interference between multiple antenna radiators operating in the same frequency band is more considerable. Thus, it is difficult to construct antenna radiators that transmit and receive signals at the same frequency band in the mobile terminal 100 having a small space. To solve the problem, the fourth antenna radiator 240 in accordance with the present disclosure may have additional radiators sharing the ground line 241 to avoid mutual interference.

FIG. 11 is a view for explaining the operation and the distribution of the electric field of the antenna pattern 250 of the mobile terminal 100 according to an embodiment of the present disclosure. (a) is a diagram showing a current flow when power is applied to a feeding line 252 of the antenna pattern 250. (b) is a diagram showing the electromagnetic field formed when power is applied to the feeding line 252 of the antenna pattern 250.

Antenna patterns 250 that shares the ground line 241 of the fourth antenna radiator 240 may be further included. An end of each of the antenna patterns 250 overlaps with the slot formed by the fourth antenna radiator 240 and the middle frame 290 in the thickness direction. The antenna patterns 250 are spaced apart from each other in the back direction. The patterns may be located at the inner face of the rear case located on the back of the middle frame 290. The patterns may be implemented by injecting or patterning the inner face of the rear case.

The antenna patterns 250 may include a first pattern 254 and a second pattern 255, and a gap 253, which is the spacing between the first pattern 254 and the second pattern 255. The ground line 241 is connected to the first pattern 254 and the feeding line 252 is connected to the second pattern 255. The gap 253 acts like a capacitor. Thus, this configuration may reduce the interference between the patterns and the fourth antenna radiator 240 by using the characteristic that the electric charge accumulates in the gap 253.

Even when the first pattern 254 and second pattern 255 are not connected to each other, the gap 253 serves as a capacitor. Thus, when the gap 253 has been charged, current may flow between the first pattern 254 and second pattern 255. Thus, the current flows from the first pattern 254 to the second pattern 255 while looping along the antenna pattern 250. As described above, the slot formed by the fourth antenna radiator 240 overlaps the antenna pattern 250 and the first and second patterns shares the ground line 241. As a result, the current flows through the fourth antenna radiator 240 due to the current flowing through the antenna pattern 250. Thus, the fourth antenna radiator 240 may act partially as a slot antenna.

As shown in FIG. 11b, the largest electric field is formed at the gap 253 due to the accumulation of charges in the gap 253. When, as shown in FIG. 10b, the fourth antenna radiator 240 operates, the location where the energy is mainly emitted (a portion correspond to the largest intensity of the electric field) is the fourth slit 204. As shown in FIG. 11b, when the antenna pattern 250 works, the location where the energy is mainly emitted is the gap 253 of the antenna pattern 250. Thus, the locations where the energy is mainly emitted may be different between the fourth antenna radiator 240 and antenna pattern 250. Thus, interference between the fourth antenna radiator 240 and the antenna pattern 250 may be reduced.

The antenna pattern 250 overlaps with the middle frame 290 as the ground when viewed from a rear face of the middle frame 290. When the pattern is overlapped with the ground, the charge is caught by the ground and thus the radiation performance is deteriorated. However, the patterns 250 may share the ground line 241 with the fourth antenna radiator 240. Thus, the patterns 250 may radiate the energy as shown in FIG. 11b using the effect from the fourth antenna radiator 240.

As described above, the mobile terminal 100 according to the present disclosure can minimize the interference between the antenna radiators that transmit and receive signals at each frequency, thereby improving the antenna performance. Further, even when the size of the display unit is large, the performance of the antenna can be secured, thereby reducing the size of the top bezel above the display unit.

The above detailed description should not be construed as being limitative in all terms, but should be considered as being illustrative. The scope of the present invention should be determined by reasonable analysis of the accompanying claims, and all changes in the equivalent range of the present invention are included in the scope of the present invention.

What is claimed is:

1. A mobile terminal comprising:
a frame including a metallic material;
a side case including a metallic material and separated from the frame,
wherein the side case forms an appearance of the mobile terminal and includes a plurality of antenna radiators and a plurality of slits defined between the plurality of antenna radiators; and
a printed circuit board (PCB) including:
a plurality of ground lines connected to each of the plurality of antenna radiators; and
a plurality of feeding lines for supplying power to each of the plurality of antenna radiators,
wherein the side case has a first side, a second side adjacent to the first side, a third side opposite the second side, and a fourth side opposite the first side,
wherein the plurality of slits includes:
a first slit and a second slit defined on the first side of the side case; and
a third slit and a fourth slit defined on the second side and the third of the side case respectively,
wherein the third slit and the fourth slit are closer to the first side than to the fourth side, and
wherein the plurality of antenna radiators includes:
a first antenna radiator disposed between the first slit and the second slit and electrically connected with a first feeding line of the plurality of feeding lines;
a second antenna radiator disposed between the second slit and the fourth slit and electrically connected with a second feeding line of the plurality of feeding lines;
a third antenna radiator disposed between the third slit and the first slit and electrically connected with a third feeding line of the plurality of feeding lines; and
a fourth antenna radiator disposed between the fourth slit and a point of the third side connected to the frame and electrically connected with a fourth feeding line of the plurality of feeding lines.

2. The mobile terminal of claim 1, further comprising:
an antenna pattern connected to a ground line connected to the fourth antenna radiator.

3. The mobile terminal of claim 2, wherein the antenna pattern overlaps the frame, and
wherein the antenna pattern includes a first pattern and a second pattern, and a gap defined between the first pattern and second pattern.

4. The mobile terminal of claim 3, wherein the first pattern is connected to the ground line and the second pattern is connected to a feeding line of the plurality of feeding lines.

5. The mobile terminal of claim 1, wherein the side case further includes an auxiliary radiator including a first end adjacent to the third slit and a second end connected to the frame, and
wherein the auxiliary radiator is not connected to the third feeding line.

6. The mobile terminal of claim 1, wherein the second antenna radiator is connected to the second feeding line at position adjacent to first end of the second antenna radiator, and
wherein the third antenna radiator is connected to the third feeding line at a position adjacent to a first end of the third antenna radiator.

7. The mobile terminal of claim 1, wherein the first antenna radiator is connected to the first feeding line at a position adjacent to a second end of the first antenna.

8. The mobile terminal of claim 7, further comprising:
a switch connected to a first end of the first antenna radiator.

9. The mobile terminal of claim 1, wherein a length of the first antenna radiator is larger than each of a length of the second antenna radiator and a length of the third antenna radiator.

10. The mobile terminal of claim 1, further comprising:
a display unit on a front face of the frame,
wherein a distance between an end of the display unit and the first side of the side case is smaller than or equal to 6 mm.

11. The mobile terminal of claim 1, wherein the PCB further includes a ground connected to the frame, and
wherein each ground line is connected to the frame or to the ground.

12. The mobile terminal of claim 11, wherein each ground line connects the frame to each antenna radiator, and
wherein each ground line is integral with the frame and the side case.

* * * * *